United States Patent
Bogner et al.

(10) Patent No.: US 8,892,324 B2
(45) Date of Patent: Nov. 18, 2014

(54) SAFETY CLUTCH FOR AN ELECTRIC DRIVE AND USE OF THE SAFETY CLUTCH IN A WHEELED VEHICLE

(75) Inventors: Michael Bogner, Eckental (DE); Raphael Fischer, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/698,176

(22) PCT Filed: Apr. 11, 2011

(86) PCT No.: PCT/EP2011/055640
§ 371 (c)(1),
(2), (4) Date: Nov. 15, 2012

(87) PCT Pub. No.: WO2011/147634
PCT Pub. Date: Dec. 1, 2011

(65) Prior Publication Data
US 2013/0060437 A1   Mar. 7, 2013

(30) Foreign Application Priority Data

May 27, 2010   (DE) .......................... 10 2010 021 808

(51) Int. Cl.
*F16D 11/14*   (2006.01)
*F16D 41/26*   (2006.01)
*F16D 41/08*   (2006.01)
*B60L 3/00*   (2006.01)

(52) U.S. Cl.
CPC ................ *F16D 11/14* (2013.01); *F16D 41/26* (2013.01); *F16D 41/086* (2013.01); *B60L 3/0061* (2013.01)
USPC .......................................... 701/67; 192/69.61

(58) Field of Classification Search
USPC .......................................... 701/67; 192/69.91
See application file for complete search history.

(56) References Cited

U.S. PATENT DOCUMENTS

| 4,899,856 A | 2/1990 | Kurihara |
| 2009/0066169 A1* | 3/2009 | Schweiher et al. ............. 310/14 |

FOREIGN PATENT DOCUMENTS

| DE | 10021368 A1 * | 11/2001 |
| DE | 20 2009 014 490 U1 | 2/2010 |
| EP | 1 900 953 A1 | 3/2008 |
| WO | WO 89/12179 | 12/1989 |

(Continued)

OTHER PUBLICATIONS

Balasz et al., DE10021368 (A1), Espacenet machine translation from German to English for bibliographic data and claims, publication date Nov. 15, 2001.*

*Primary Examiner* — Mary Cheung
*Assistant Examiner* — Yuen Wong
(74) *Attorney, Agent, or Firm* — Davidson, Davidson & Kappel, LLC

(57) ABSTRACT

A safety clutch for an electric drive which includes an electric motor and a shaft which is driven thereby. A transmission of torque between the electric motor and the shaft can be brought about by at least one connecting element. A controllable locking device via which an interruption in the transmission of torque between the electric motor and the shaft can be brought about, is assigned to the connecting element. The use of the safety clutch in an electric drive for a wheeled vehicle is disclosed, a controller evaluating the transmission of torque between the electric motor and the shaft using a vehicle state, and when a fault state is detected the controller transmitting a control signal to the controllable locking device, as a result of which an interruption is brought about in the transmission of torque between the electric motor and the shaft.

4 Claims, 7 Drawing Sheets

SAFETY CLUTCH FOR AN ELECTRIC DRIVE AND USE OF THE SAFETY CLUTCH IN A WHEELED VEHICLE

FIELD OF THE INVENTION

The present invention relates to a safety clutch for an electrical drive and to the use thereof in a wheeled vehicle. Specifically, the present invention relates to a safety clutch which, in the event of a short circuit in the electric motor, allows the electric motor to be decoupled from the drive end.

BACKGROUND

German Utility Model Publication No. DE 20 2009 014 490 U1 discloses a drive system for a non-railbound vehicle including an electric drive. The electric drive is a combination of at least one non-permanent magnet electric motor and at least one permanent magnet synchronous motor. A mechanical decoupling unit is arranged downstream of the latter at the drive end. In the event of a fault, said mechanical decoupling unit allows the synchronous motor to be disconnected from the unit to be driven. The decoupling unit is designed, in particular, as a one-way clutch which transmits torque to the driven unit in one direction only.

When electric motors are used for driving a machine, a short circuit in the electric motor can result in braking forces acting on the rotor of the electric motor. The shaft initially driven by the motor transmits such braking forces to the drive end, causing an abrupt change in the behavior of the machine, as a result of which problems can occur. If, in particular, the machine is a wheeled vehicle, and the electric motor drives at least one wheel of the wheeled vehicle, then a short circuit in the electric motor ultimately results in a braking torque acting on the wheel. This impairs the driving stability of the wheeled vehicle and poses a significant problem in terms of road safety. This problem is particularly serious in the case of vehicles in which an electric motor having permanent magnets is used, because a permanent magnet cannot be turned off; which means that, according to Lenz's law, its magnetic field, together with the conductor windings of the motor, produces a braking torque on the rotor which ultimately cannot be uncontrolled from outside the motor.

One remedy is to decouple the motor from the drive end in the event of a short circuit, so that the braking torque generated cannot be transmitted to the drive end and, in the case of a wheeled vehicle, can therefore not act on a wheel. In cited Utility Model Publication No. DE 20 2009 014 490 U1, this problem is solved specifically in that the permanent magnet synchronous motors used act on the drive shaft via freewheels which, by design, never transmit torques in an undesired direction, such as in the case of a braking torque. This has the disadvantage that in situations where a torque in such direction is required, this torque cannot be provided directly by the synchronous motors.

SUMMARY OF THE INVENTION

It is an object of the present invention to provide a safety clutch for an electrical drive which allows the electric motor to be decoupled from the drive shaft in a controlled manner, and to achieve this in an economical and non-critical manner in terms of space and weight.

The present invention provides a safety clutch for the electric drive of a wheeled vehicle in a manner which will ensure the driving stability and road safety of the wheeled vehicle in the event of a short circuit of the electric motor.

The safety clutch constituting the subject matter of the present invention provides a mechanical coupling between an electric motor and a shaft drivable by said electric motor in an electric drive. In accordance with the present invention, the safety clutch has at least one connecting element by which the mechanical coupling is provided between the electric motor and the shaft, which here means by which torque may be transmitted between the electric motor and the shaft. Also in accordance with the present invention, the at least one connecting element has a controllable locking means associated therewith which is capable of causing an interruption in the transmission of torque between the electric motor and the shaft. In embodiments of the present invention, the interruption in the transmission of torque is brought about by a change in position of the at least one connecting element. The transmission of torque between the electric motor and the shaft driven by the electric motor is achieved in that a rotating element of the electric motor mechanically cooperates with the at least one connecting element and the at least one connecting element mechanically cooperates with the shaft in such a way that a transmission of torque can be brought about.

In one class of embodiments of the present invention, the controllable locking means takes the form of a blocking device which is switchable between a blocked state and an unblocked state. The electric motor, the shaft and the at least one connecting element are configured to cooperate in such a way that in the unblocked state, the transmission of torque between the electric motor and the shaft can be interrupted, whereas in the blocked state, the transmission of torque between the electric motor and the shaft is ensured by the at least one connecting element. In exemplary embodiments, this is achieved in that through the interaction of the electric motor, the shaft and the at least one connecting element, a force component is produced on the at least one connecting element, which force component by itself would cause a change in position or displacement of the at least one connecting element, for example, in a longitudinal direction of the shaft. In the unblocked state, such a change in position is not limited by the blocking device. As mentioned earlier above, the change in position of the at least one connecting element causes an interruption in the transmission of torque between the electric motor and the shaft. In the blocked state, the blocking device prevents, or at least limits, the change in position of the at least one connecting element in such a way that no interruption occurs in the transmission of torque between the electric motor and the shaft.

In embodiments of the safety clutch, the at least one connecting element is a ring having an inner surface and an outer surface. A toothing is formed in at least a portion of the inner surface of the ring, and also in at least a portion of the outer surface of the ring. The electric motor and the shaft also have respective toothings. Due to these toothings, the ring, the shaft and the electric motor cooperate in such a way that in the unblocked state of the blocking device, the transmission of torque between the electric motor and the shaft can be interrupted by displacement of the ring. In a specific embodiment of the safety clutch, the toothing on the inner surface of the ring and the toothing on the outer surface of the ring are formed by ribs. The ribs on the outer surface of the ring have a first common longitudinal rib direction, and the ribs on the inner surface of the ring have a second common longitudinal rib direction, such that the first longitudinal rib direction is oriented parallel to a longitudinal direction of the shaft and the second longitudinal rib direction is oriented at an angle with respect to the longitudinal direction of the shaft, or alternatively such that the first longitudinal rib direction is oriented at an angle with respect to the longitudinal direction of the shaft and the second longitudinal rib direction is oriented parallel to the longitudinal direction of the shaft. In this connection, either the toothing on the electric motor engages with the toothing on the outer surface of the ring and the toothing on the shaft engages with the toothing on the inner surface of the ring, or the toothing on the electric motor engages with the toothing on the inner surface of the ring and the toothing on the shaft engages with the toothing on the outer surface of the ring. The toothings on the shaft and on the electric motor have corresponding orientations.

In other embodiments of the safety clutch according to the present invention, the connecting elements take the form of rolling elements. Each rolling element engages with both a groove on the electric motor and a groove on the shaft. The two grooves that are in engagement with the respective rolling element form an angle other than zero. Due to this angle, the interaction of the electric motor, the shaft and the respective connecting element produces a force component on the respective connecting element, which force component by itself would cause a change in position or displacement of the respective connecting element, for example, in a longitudinal direction of the shaft. As explained earlier above, in the blocked state of the blocking device, such displacement is prevented or limited, so that torque can be transmitted between the electric motor and the shaft, whereas in the unblocked state, a transmission of torque between the electric motor and the shaft can be interrupted by such displacement. In a refinement of these embodiments, the rolling elements are held by a cage. The rolling elements may, for example, be balls or cylinders. Other rolling element shapes may also be used. The groove cross section is then adapted to the particular shape of the rolling element used.

In another class of embodiments of the present invention, the controllable locking means takes the form of an actuator. The actuator allows the at least one connecting element to be displaced in such a way that a transmission of torque between the electric motor and the shaft is interruptible. In some of such embodiments, the at least one connecting element is a ring having an inner surface and an outer surface. A toothing is formed in at least a portion of said inner surface and in at least a portion of said outer surface, respectively. The electric motor and the shaft also have respective toothings. Due to these toothings, torque can be transmitted between the electric motor and the shaft via the ring.

In other exemplary embodiments of the present invention in which the controllable locking means is an actuator, the connecting elements are rolling elements. The rolling elements are preferably held in a cage. Each rolling element is in engagement with both a groove on the shaft and a groove on the electric motor in such a way torque can be transmitted between the electric motor and the shaft. The rolling elements may, for example, be balls or cylinders. It is obvious to those skilled in the art that other rolling element shapes may also be used. The groove cross section is then adapted to the particular shape of rolling the element used.

It will be apparent to those skilled in the art that in all of the embodiments mentioned, the friction between the at least one connecting element and the shaft and between the at least one connecting element and the electric motor should preferably be as low as possible, especially to allow the transmission of torque between the electric motor and the shaft to be reliably interrupted when desired. Therefore, it is obvious that the relevant contact surfaces should be suitably lubricated and/or provided with a friction-reducing coating.

A safety clutch of the type described in the present invention is suitable for use in an electric drive for a wheeled vehicle. In this case, a control system is provided which evaluates the torque transmitted between the electric motor and the shaft taking into account a vehicle state, and when a fault state is detected, said control system transmits a corresponding control signal to the locking means, so that the transmission of torque between the electric motor and the shaft is interrupted. The vehicle state may include information as to whether the wheeled vehicle is moving forward or backward, or whether a brake was applied, for example. Furthermore, additional data, such as data about the operating state of the electric motor and its power supply, may also be considered by the control system in the evaluation.

BRIEF DESCRIPTION OF THE DRAWINGS

The present invention and its advantages will now be described in more detail with reference to the accompanying drawings.

DETAILED DESCRIPTION

Figure 1:
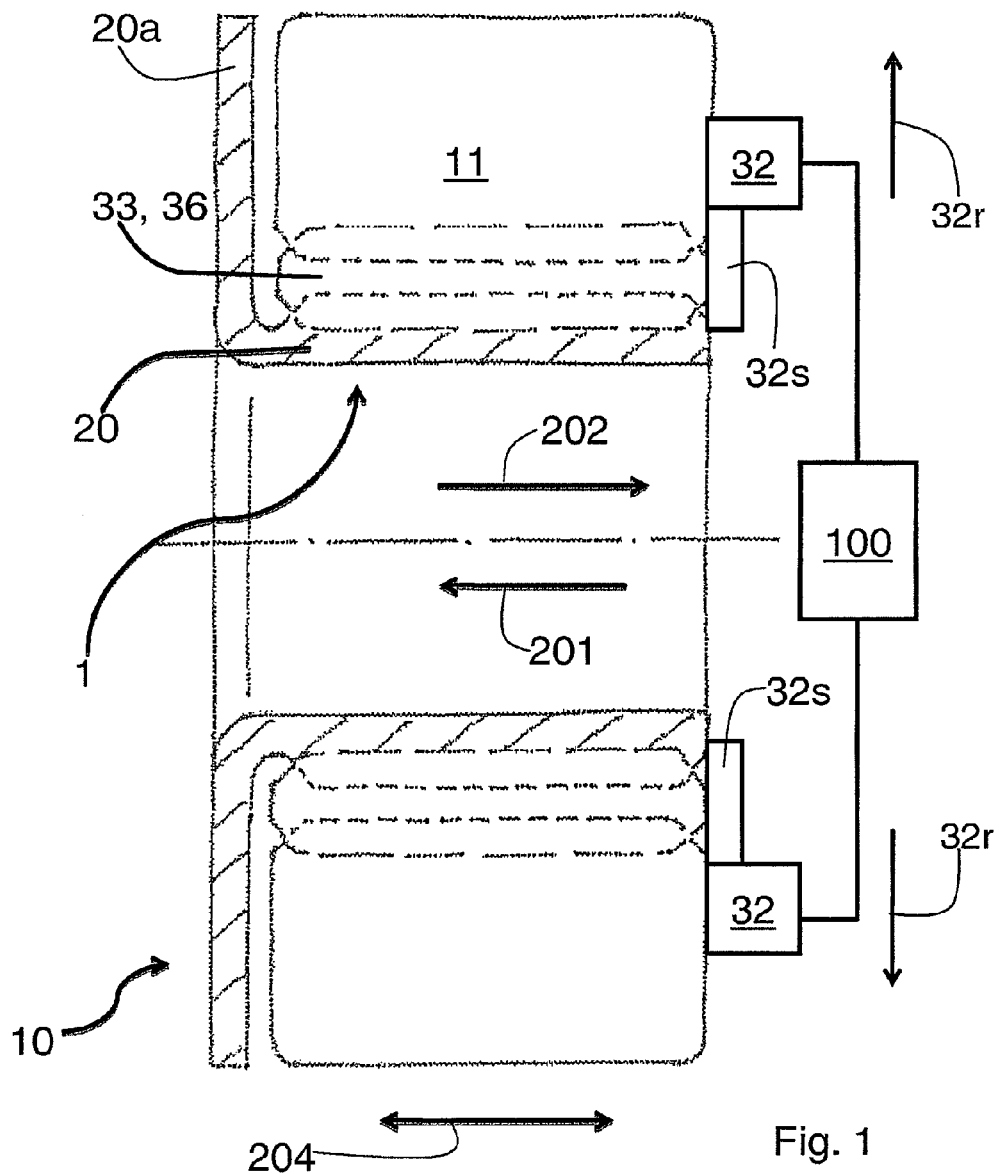
FIG. 1 is a schematic longitudinal cross-sectional view of an embodiment of the safety clutch according to the present invention, where the locking means is a blocking device.

In the drawings, like reference characters identify identical or functionally equivalent elements. Moreover, for the sake of clarity, only those reference numerals are shown in the figures which are necessary for the description of the respective figure or to place the respective figure in the context of the other figures. Furthermore, the figures are merely schematic in nature and, therefore, the relative sizes of individual elements shown in the figures should not be taken to be an accurate depiction of the actual relative sizes.

FIG. 1 shows a longitudinal section of an embodiment of a safety clutch 1 according to the present invention. An electric motor 11 is provided for driving a shaft 20. Here, electric motor 11 takes the form of a hollow-shaft internal rotor motor, but this should not be construed as limiting the present invention. The motor could also be an external-rotor motor. In further embodiments, a portion of a rotor shaft of electric motor 11 encompasses driven shaft 20 or, conversely, driven shaft 20 encompasses a portion of the rotor shaft of electric motor 11. These and other embodiments of the coupling and variants thereof are in principle known to those skilled in the art. In accordance with the present invention, torque is not transmitted directly between electric motor 11 and shaft 20, but via a connecting element 33, 36 which is disposed between electric motor 11 and shaft 20 and is in engagement with electric motor 11 and shaft 20.

In the embodiment shown, connecting element 33, 36 is designed such that the interaction of connecting element 33, 36 with electric motor 11 and shaft 20 produces a force component on connecting element 33, 36 in a direction parallel to a longitudinal direction 204 of shaft 20. In the embodiment shown, a fixed limiting means, here in the form of a portion 20a of shaft 20, prevents displacement in a first direction 201 in response to said force component. In the embodiment shown, displacement in a second direction 202 opposite to first direction 201 is limited by a blocking device 32. Blocking device 32 is shown in the blocked state, in which displacement of connecting element 33, 36 in second direction 202 is prevented by blocking elements 32s. Blocking elements 32s elements may, for example, be pins which prevent uncontrolled displacement of connecting element 33, 36.

In variants of the embodiment shown, displacement of connecting element 33, 36 may be limitable by a blocking device 32 in both first direction 201 and second direction 202. It is also conceivable to provide separately controllable blocking devices, such that displacement of connecting element 33, 36 in first direction 201 is limited by a first blocking device, and displacement of connecting element 33, 36 in second direction 202 is limited by a second blocking device.

Blocking device 32 is connected to a control system 100. Control system 100 monitors the transmission of torque between electric motor 11 and shaft 20. In most uses of safety clutch 1, in order to evaluate the transmission of torque between electric motor 11 and shaft 20, the control system also uses data of the device in which safety clutch 1 is used. Safety clutch 1 may be used, for example, in an electric drive 10 of a wheeled vehicle. In this case, control system 100 includes vehicle state data, such as whether the vehicle is moving forward or backward, or whether a brake was applied, in the evaluation of the transmission of torque between electric motor 11 and shaft 20. Furthermore, control system 100 may also include data about the operating state of the electric motor and/or its power supply in the evaluation. If, for example, due to a short circuit occurring in electric motor 11, control system 100 detects a fault state, it sends a control signal to blocking device 32 which then changes to an unblocked state. In the embodiment shown, this is accomplished, for example, by displacing blocking elements 32s radially outwardly in directions 32r, so that they no longer limit displacement of connecting element 33, 36 in second direction 202. The connecting element is configured such that in the fault states considered by the control system 100, the force component produced by the interaction of connecting element 33, 36 with electric motor 11 and shaft 20 is directed in second direction 202. In the unblocked state, connecting element 33, 36, which is no longer limited in its displacement by blocking elements 32s, is displaced by said force component in second direction 202 until the transmission of force between electric motor 11 and shaft 20 is interrupted.

Figure 2A:
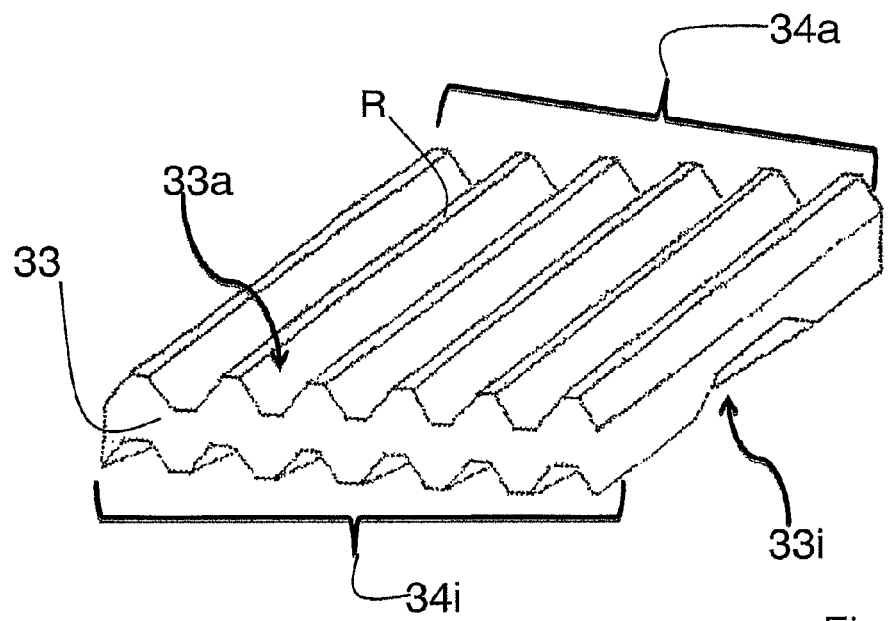
FIG. 2a is a perspective, developed view of a portion of a ring.

FIG. 2a shows in a perspective, developed view a portion of a connecting element in the form of a ring 33. Ring 33 has a toothing 34a on an outer surface 33a and a toothing 33i on an inner surface 33i. If the ring 33 shown is used as a connecting element in the embodiment of FIG. 1, then outer surface 33a is in engagement with electric motor 11 and inner surface 33i is in engagement with shaft 20. The view shown is looking at outer surface 33a, while showing only a portion of toothing 34i on inner surface 33i. The toothings are each formed by ribs R.

Figure 2B:
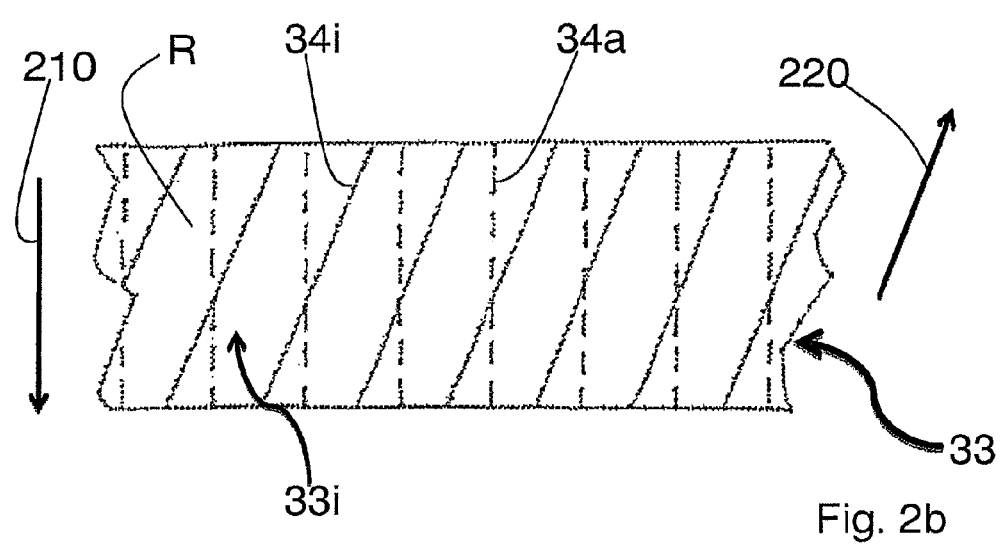
FIG. 2b is a plan, developed view of a portion of a ring.

FIG. 2b shows in a plan, developed view a portion of a connecting element in the form of a ring 33. The shown portion of ring 33 substantially corresponds to the portion shown in FIG. 2a. This view is looking at inner surface 33i of ring 33. The dashed lines indicate the arrangement and orientation of toothing 34a on the outer surface, which cannot be seen. The toothings are each formed by ribs R. If the ring 33 shown is used as a connecting element in the embodiment of FIG. 1, then outer surface of ring 33 is in engagement with electric motor 11 and inner surface 33i is in engagement with shaft 20. In this case, a first longitudinal rib direction 210 of ribs R on the outer surface of ring 33 is parallel to longitudinal direction 204 of shaft 20, while second longitudinal rib direction 220 of ribs R on inner surface 33i of ring 33 is at an angle with respect to longitudinal direction 204 of shaft 20.

Figure 3:
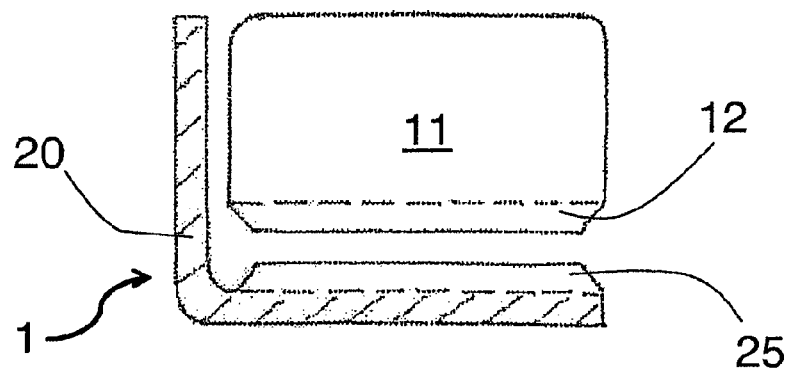
FIG. 3 is a longitudinal cross-sectional view of an embodiment of the safety clutch according to the present invention, where the connecting element is removed.

FIG. 3 shows an embodiment of safety clutch 1 according to the present invention in a longitudinal cross-sectional view with the connecting element removed. A toothing 12 is formed on electric motor 11, and a toothing 25 is formed on shaft 20. When using a ring 33 according to the embodiments shown in FIGS. 2a and 2b, toothing 12 on electric motor 11 is in engagement with toothing 34a on outer surface 33a of ring 33, and toothing 25 on shaft 20 is in engagement with toothing 34i on inner surface 33i.

Figure 4:
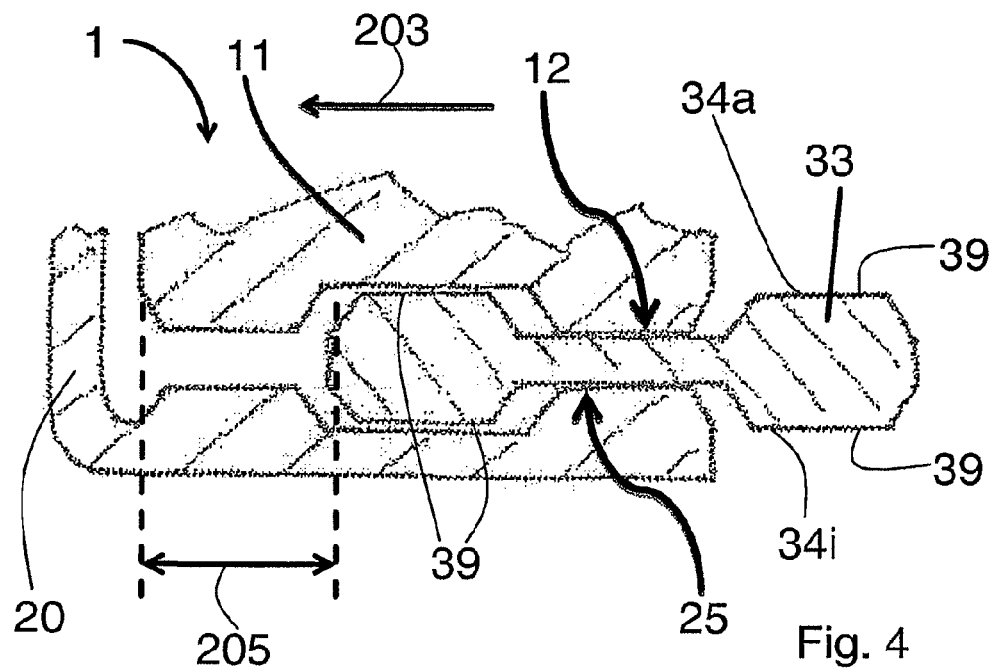
FIG. 4 is a view of an embodiment of the safety clutch according to the present invention, where the connecting element has an alternative design.

FIG. 4 shows an embodiment of safety clutch 1 according to the present invention in a view depicting an alternative design of a connecting element in the form of a ring 33. Only portions 39 of ring 33 have toothings 34a, 34i, which are associated with toothings 12, 25 provided in, and limited to, correspondingly configured portions of shaft 20 and electric motor 11. In the view shown, ring 33 assumes a position in which no torque can be transmitted between electric motor 11 and shaft 20.

When ring 33 is displaced in the direction of arrow 203 until toothings 34i, 34a are in engagement with toothing 12 on the electric motor and toothing 25 on the shaft, then torque can be transmitted between electric motor 11 and shaft 20. In this embodiment of ring 33, the magnitude of the displacement 205 of ring 33 required to interrupt the transmission of torque between electric motor 11 and shaft 200 is less than in the case of a ring 33 provided with a toothing 34a over its entire outer surface 33a (see FIG. 2a) and with a toothing 34i over its entire inner surface 33i (see FIG. 2b).

Figure 5A:
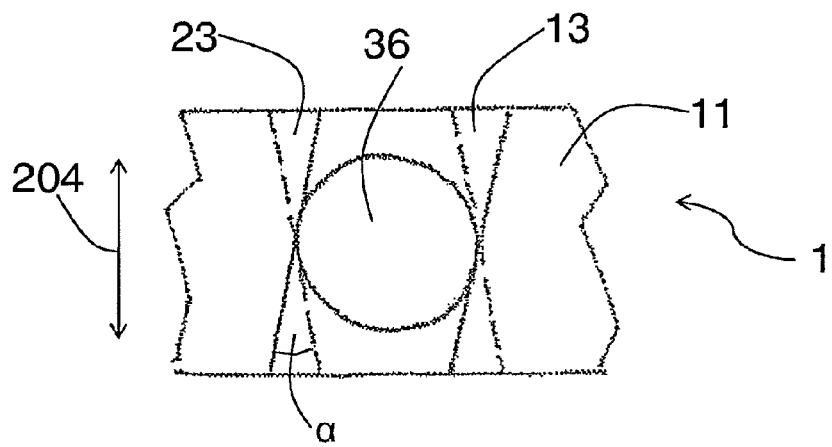
FIG. 5a is a plan view of a portion of an embodiment of the safety clutch according to the present invention, where the connecting elements are balls.

FIG. 5a shows an embodiment of safety clutch 1 according to the present invention in which rolling elements 36, here balls, are used as connecting elements. The view of FIG. 5a, which is looking perpendicular to longitudinal direction 204 of shaft 20 (see FIG. 1), shows several elements disposed one behind the other in the direction of view. Electric motor 11 is formed with grooves 13 which are in engagement with rolling elements 36. Rolling elements 36 are also in engagement with grooves 23 formed on shaft 20. Grooves 13 on electric motor 11 and grooves 23 on shaft 20 form an angle α other than zero. Torque may be transmitted between electric motor 11 and shaft 20 by rolling elements 36. Due to angle α, a force component is produced on rolling elements 36 in longitudinal direction 204 of shaft 20. Analogously to FIG. 1, a locking means (not shown here) prevents rolling elements 36 from being urged out of grooves 13, 23 by this force component. Analogously to the embodiment of FIG. 1, a control system 100 may be provided which, upon detection of a fault state, causes the locking means to change to the unblocked state.

It is explicitly pointed out that, besides balls, other rolling elements may also be used. One example would be cylindrical rolling elements guided in grooves of rectangular cross section, the curved outer surfaces of the cylinders being in contact with the side surfaces of grooves 13, 23. In this case, a representation analogous to that of FIG. 5a would be obtained. The circle denoted 36 would then represent a cross section through a cylinder perpendicular to the cylinder axis.

Figures 5B, 5C:
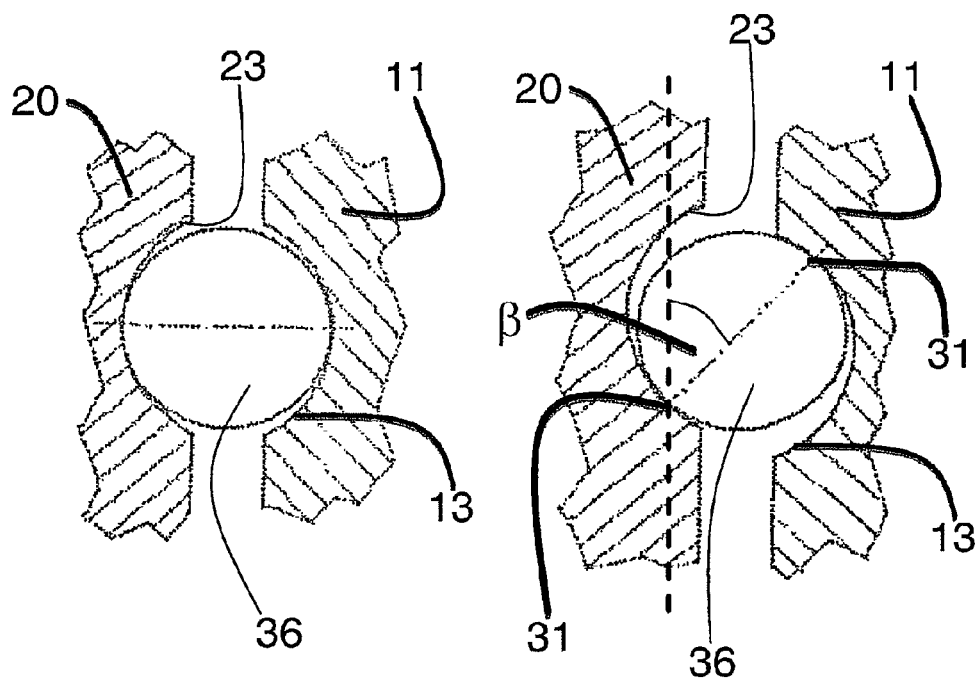
FIG. 5b is a cross-sectional view of a portion of an embodiment of the safety clutch according to the present invention, where the connecting elements are balls.
FIG. 5c is a cross-sectional view of a portion of an embodiment of the safety clutch according to the present invention, where the connecting elements are balls.

FIG. 5b shows a cross section through the arrangement shown in FIG. 5a. In the situation shown, no torque is transmitted between electric motor 11 and shaft 20.

FIG. 5c substantially corresponds to FIG. 5b, but illustrates the case where torque can be transmitted between electric motor 11 and shaft 20. The cross section of grooves 13, 23 and rolling elements 36 are matched such that, firstly, a desired pressure angle β is obtained and, secondly, contact between rolling elements 36 and grooves 13, 23 is limited to two contact areas 31 which are small as compared to the surface area of a rolling element. The latter helps allow rollers 36 to roll out in an unhindered manner in the unblocked state of a locking means not shown here.

Figure 6:
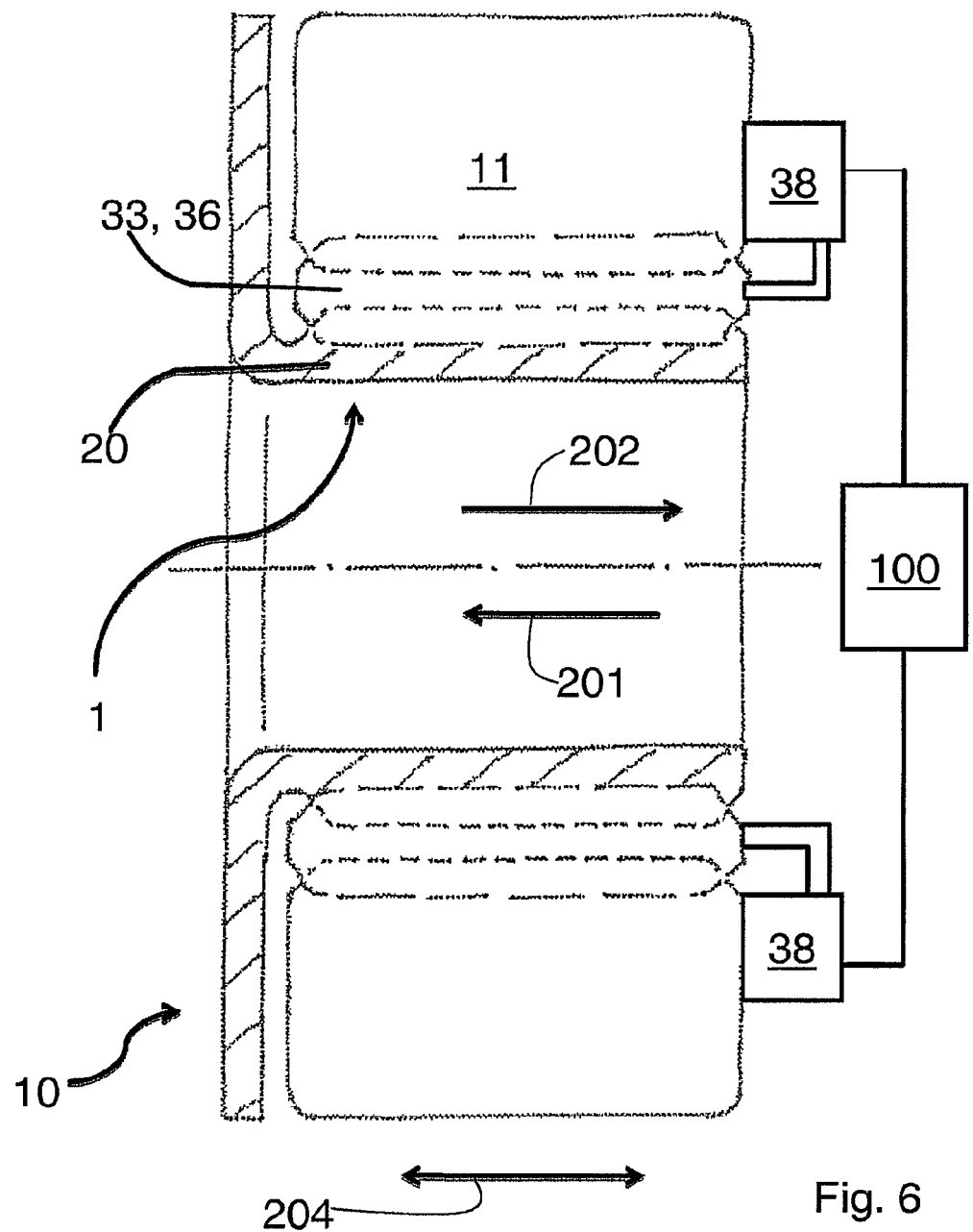
FIG. 6 is a longitudinal cross-sectional view of an embodiment of the safety clutch according to the present invention, where the locking means is an actuator.

FIG. 6 substantially corresponds to FIG. 1, where most of the elements shown were already described. However, FIG. 6 shows an embodiment of the present invention where the locking means is an actuator 38. If control system 100 detects a fault state in the manner described in FIG. 1, it sends a control signal to actuator 38 which then displaces the at least one connecting element 33, 36 in second direction 202 in such a way that a transmission of torque between electric motor 11 and shaft 20 is interrupted.

In embodiments of the present invention, actuator 38 may be formed of a plurality of actuator units which are suitably arranged in safety clutch 1 and which, upon detection of a fault state by control system 100, are controlled by control system 100 in such a way that connecting element 33, 36 is displaced through the interaction of the plurality of actuator units.

Figure 7:
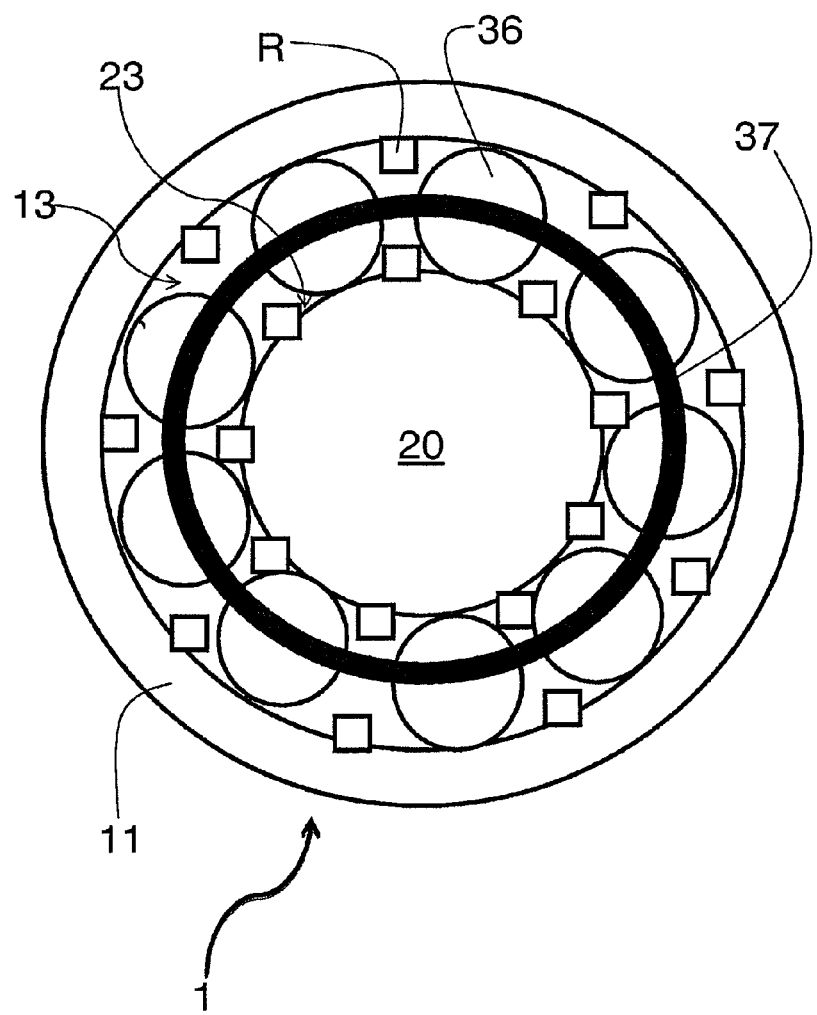
FIG. 7 is a cross-sectional view of an embodiment of the safety clutch according to the present invention, where the connecting elements are caged rolling elements.

FIG. 7 shows a cross section through a safety clutch 1 according to the present invention. The connecting elements take the form of rolling elements 36 and are held by a cage 37. The use of a cage 37 for rolling elements 36 is possible both in the case that locking is accomplished by a blocking device 32 (see FIG. 1) and in the case that locking is accomplished by an actuator 38 (see FIG. 6). If locking is accomplished by an actuator 38, then when the transmission of torque between electric motor 11 and shaft 20 is to be interrupted, the actuator preferably acts on cage 37 to displace cage 37 and thereby displace rolling elements 36. Ribs R are shown very schematically in this figure. In the embodiment shown, these ribs define grooves 23 on shaft 20 and grooves 13 on electric motor 11. In preferred embodiments of the present invention, the cross section of grooves 13, 23 is matched to rolling elements 36. This cannot be seen in the schematic view of FIG. 7. When actuator 38 locks, then grooves 13 on the electric motor and grooves 23 on the shaft are all preferably oriented in longitudinal direction 204 (see FIG. 6) of shaft 20.

Figure 8:
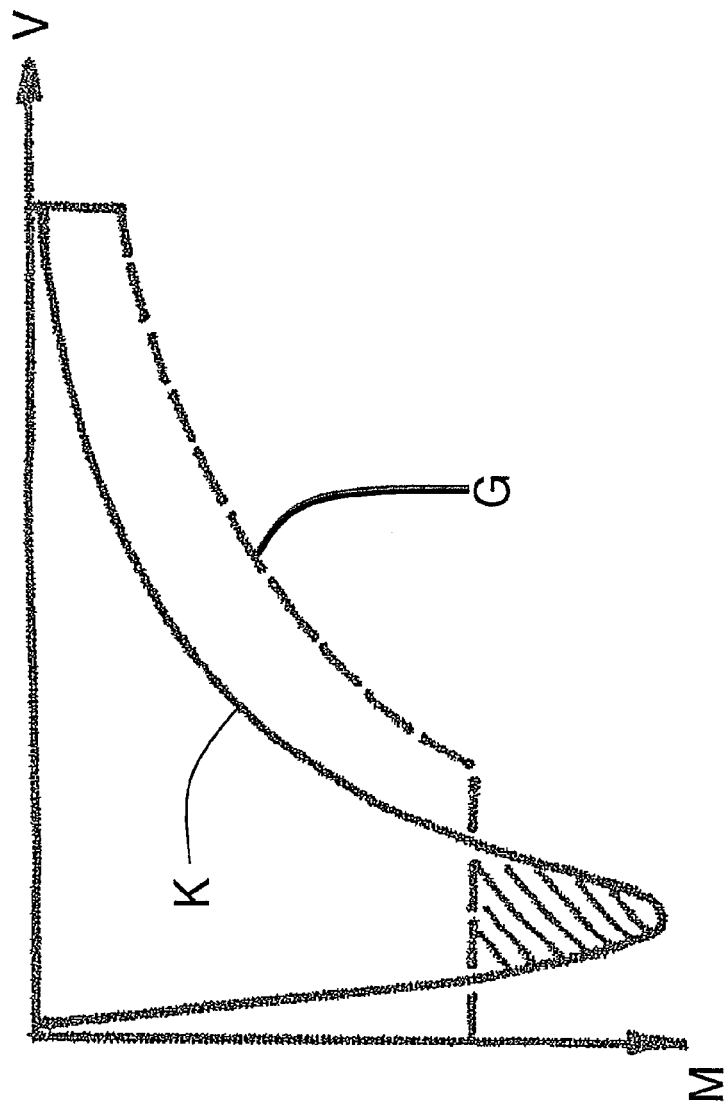
FIG. 8 is a schematic diagram illustrating the relationship between a vehicle speed and braking torques of the electric motor.

FIG. 8 relates to the use of the safety clutch of the present invention in an electric drive for a wheeled vehicle. The diagram illustrates the relationship between the braking torque G during regenerative braking and the short-circuit braking torque K which is produced when a short circuit occurs in the electric motor of the electric drive. V denotes the vehicle speed. M designates the axis on which the braking torques are plotted. It can be seen that during regenerative braking, braking torque G exceeds short-circuit braking torque K over large speed ranges. Therefore, the interruption of the transmission of torque between the electric motor and the shaft by the locking means of the safety clutch cannot be made dependent on the magnitude of the produced braking torques alone. Consequently, a control system is required which also takes into account the vehicle state.

The present invention has been described with reference to preferred embodiments. However, it will be apparent to those skilled in the art that modifications and variations may be made without departing from the protective scope of the following claims.

What is claimed is:

1. A safety clutch for an electric drive, the electric drive including an electric motor and a shaft drivable by the electric motor, the safety clutch comprising:
   at least one connecting element, torque being transmittable between the electric motor and the shaft via the at least one connecting element; and
   a controllable locking device associated with the at least one connecting element, the locking device capable of causing an interruption in the transmission of torque between the electric motor and the shaft,
   wherein the controllable locking device includes a blocking device having either a blocked or an unblocked state, and wherein in the unblocked state, the transmission of torque between the electric motor and the shaft can be interrupted through an interaction of the at least one connecting element with the shaft and the electric motor, and, in the blocked state, the transmission of torque between the electric motor and the shaft is ensured by the at least one connecting element,
   wherein the at least one connecting element includes a ring having a first toothing formed in at least a portion of an inner surface and a second toothing formed in at least a portion of an outer surface, the shaft and the electric motor having respective toothings, such that through the interaction of the ring with the shaft and the electric motor via the first and second and respective toothings, in the unblocked state of the blocking device, the transmission of torque between the electric motor and the shaft can be interrupted by displacement of the ring.

2. The safety clutch as recited in claim 1 wherein the first toothing and the second toothing are formed by ribs, the ribs on the outer surface having a first common longitudinal rib direction, and the ribs on the inner surface having a second common longitudinal rib direction, such that the first longitudinal rib direction is oriented parallel to a longitudinal direction of the shaft and the second longitudinal rib direction is oriented at an angle with respect to the longitudinal direction of the shaft, or alternatively such that the first longitudinal rib direction is oriented at an angle with respect to the longitudinal direction of the shaft and the second longitudinal rib direction is oriented parallel to the longitudinal direction of the shaft.

3. The safety clutch as recited in claim 1 wherein the locking device includes an actuator allowing the at least one connecting element to be displaced in such a way that a transmission of torque between the electric motor and the shaft is interruptible.

4. A safety clutch for an electric drive, the electric drive including an electric motor and a shaft drivable by the electric motor, the safety clutch comprising:
   at least one connecting element, torque being transmittable between the electric motor and the shaft via the at least one connecting element; and
   a controllable locking device associated with the at least one connecting element, the locking device capable of causing an interruption in the transmission of torque between the electric motor and the shaft, wherein the locking device includes an actuator allowing the at least one connecting element to be displaced in such a way that a transmission of torque between the electric motor and the shaft is interruptible,
wherein the at least one connecting element includes a ring having a first toothing formed in at least a portion of an inner surface and a second toothing formed in at least a portion of an outer surface such that through an interaction with a shaft toothing on shaft and a motor toothing on electric motor, torque is transmittable between the electric motor and the shaft.

* * * * *